United States Patent [19]

Ross

[11] 4,297,060

[45] Oct. 27, 1981

[54] ENGRAVING MACHINE

[76] Inventor: Byron W. Ross, 5839 Avenal Ave., Oakland, Calif. 94605

[21] Appl. No.: 90,493

[22] Filed: Nov. 1, 1979

[51] Int. Cl.3 .......................... B23C 3/00; B43L 13/10

[52] U.S. Cl. ...................................... 409/86; 33/23 D; 33/25 R; 409/121; 409/124; 409/125

[58] Field of Search ................. 409/86, 125, 126, 121, 409/93, 124; 33/23 D, 23 H

[56] References Cited

U.S. PATENT DOCUMENTS

| | | | |
|---|---|---|---|
| 1,095,317 | 5/1914 | Edstrom | 409/86 X |
| 2,818,000 | 12/1957 | Zwick | 409/86 |
| 3,301,287 | 1/1967 | Edwards | 409/86 X |
| 3,316,644 | 5/1967 | Baker et al. | 33/23 D |

FOREIGN PATENT DOCUMENTS

| | | | |
|---|---|---|---|
| 166136 | 6/1950 | Australia | 33/25 R |

*Primary Examiner*—William R. Briggs
*Attorney, Agent, or Firm*—Robert S. Smith

[57] ABSTRACT

A mechanism for duplicating an image includes a pantograph mechanism which is carried on a slide which may be selectively moved axially to position the pantograph. Carried on the pantograph is a cutting or marking device which may be readily interchanged. This device may be a standard rotating engraving cutter, a diamond drag engraving cutter, a laser cutting device, a heat producing device, a brush, a felt tip pen, or other apparatus.

11 Claims, 8 Drawing Figures

ENGRAVING MACHINE

BACKGROUND OF THE INVENTION

The invention relates to machines particularly adapted for engraving, marking, or cutting designs, indicia, or other desired characters on an object. More particularly it relates to such machines which produce reproductions from a pattern by means of a pantograph or like mechanical mechanisms. Pantograph mechanisms are widely used in drafting machines and other apparatus where it is desired to copy, on a predetermined scale, an image. The pantograph ordinarily includes two parallelogram sections.

A difficulty that has been encountered in using such prior art structures is that the mechanism frequently must have arms that are extremely long if it is desired to operate the mechanism with an image that is relatively large and particularly if the image which is to be produced is also relatively large. A related problem with such prior art structures is that use of relatively long arms increases the volume of the stored mechanism. This is of particular significance where the mechanism is not permanently mounted on a table or similar surface.

Still another related problem is that the use of very long arms increases the cost of manufacture because of the additional cost for material as well as the additional cost for heavier pivotal connections, etc.

It is an object of the invention to provide apparatus which will readily allow the user to use a variety of marking, cutting, grinding, and other means with a mechanical linkage which is compact when stored and which is movable to reach over the entire extent of both the image which is being copied and the image which is being produced.

Another object of the invention is to extend the versatility of small hand motor tools such as the Dremel ball-bearinged Model 383 by using them to cut multi-layered engraving plastic, etc.

Another object of the invention is to provide such apparatus which can be manufactured at relatively little cost.

SUMMARY OF THE INVENTION

It has now been found that these and other objects of the invention may be attained by a mechanism which includes a first generally planar surface, a slot disposed in the planar surface, an elongated slide disposed in the slot which is dimensioned and configured to engage the slot to allow longitudinal movement thereof and first and second elongated members each having one end pivotally carried on the elongated slide at respectively first and second points spaced apart a first distance. A connecting member is pivotally connected to the upper end of the first and second elongated members at third and fourth points thereof. The third and fourth points are spaced the same first distance apart. The third and fourth elongated members are each pivotally carried on the connecting member at respectively fifth and sixth points which are also spaced the first distance apart.

A support pivotally engages the other end of the third and fourth elongated members at respectively seventh and eighth points which are spaced the first distance apart. Means for producing an image on an associated member are carried on the support. Also means for following an associated master image are carried on the support.

The means for following may include an elongated pointed member which is axially spring biased toward the associated master and which is mounted to allow axial movement thereof away from the associated master. The means for producing an image may include a motor driven device rotating an engraving cutter at high speed; a small diamond-tipped metal rod chucked into the aforementioned device, but not rotated; a brush, pen, or other marker positioned in a sleeve in place of the motor driven device; a laser-beam cutting device; an abrasive particle cutting device; a sonic generating device; a heated instrument; and other adaptable means of cutting or making a surface.

Supports employing ball bearings, or wheels, or "Teflon" material, may be used to hold elements in proper position, prevent strain, and allow smooth, easy, fluidity of movement of the entire mechanism. This includes the slide support mount.

BRIEF DESCRIPTION OF THE DRAWING

The invention will be better understood by references to the accompanying drawing in which.

DESCRIPTION OF A PREFERRED EMBODIMENT

Figure 1:
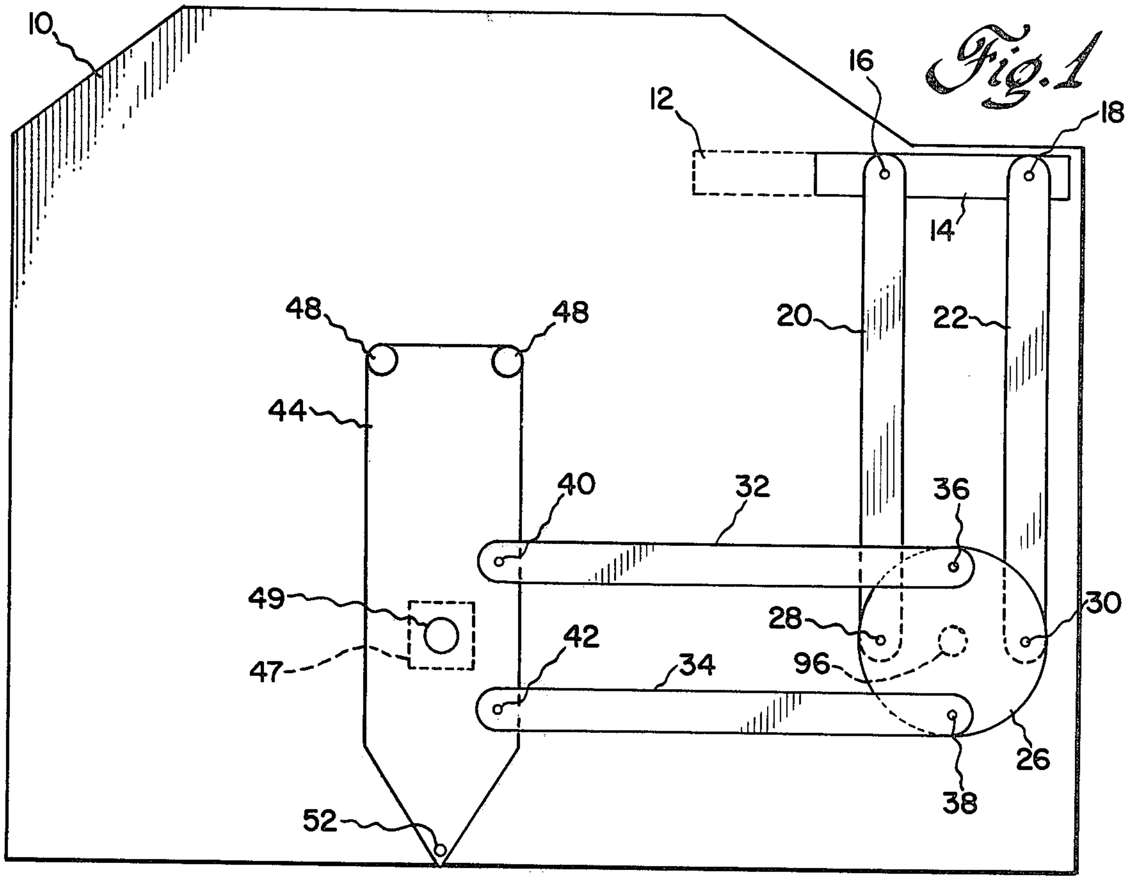
FIG. 1 is a planned view of the apparatus in accordance with one form of the invention.

Referring now to FIG. 1 there is shown apparatus in accordance with the invention. A base 10 includes an elongated slot 12 which is dimensioned and configured for receiving an elongated slide 14. The geometric configuration of the sides of the slide 14 and the cooperating surfaces of the slot 12 may vary. In one form the sides may be perpendicular to the plane which is shown in FIG. 1. In another form the cooperating surfaces may be more nearly that which is conventionally identified by the term "dovetail", or the conventional drawer-slide support which is ball-bearinged and consists of two sliding plates. First and second pivotal connections 16, 18 respectively join first and second elongated members 20 and 22 at one end thereof to the elongated slide 14. The other ends respectively of members 20, 22 are joined to disc 26 pivotally at points 28, 30. The points 28 and 30 are disposed at the same distance as points 16 and 18.

Third and fourth elongated members 32, 34 are respectively connected by pivot connections 36, 38 to the disc 26. The distance between connections 36 and 38 is again the same as the distance between connections 16 and 18. The other ends of members 32, 34 are respectively joined by pivot connections 40, 42 to a tracing and cutting support unit 44. The distance between connections 40 and 42 is the same as the distance between connections 36 and 38.

The tracing and cutting support unit 44 is intended to carry a number of cutting, grinding, and marking implements. Such implements are disposed in the area identified by the numeral 47. Ordinarily they will cooperate with the sleeve 49 which extends with the axis thereof perpendicular to the plane defined by the view of FIG. 1. Casters 48, 48 are provided at the upper extremity as viewed of the tracing and cutting support unit 44.

Figure 2:
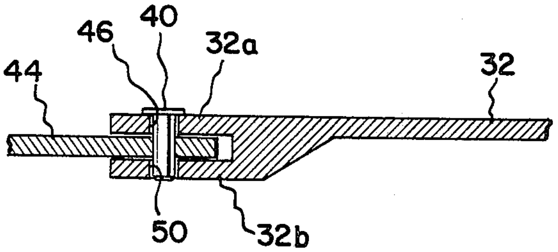
FIG. 2 is a partial elevational view of a portion of the apparatus shown in FIG. 1.

Referring to FIG. 2 there is shown in greater detail the nature of the pivot connection between the elongated member 32 and the tracing and cutting support unit 44. It will be understood the quality of the product which is produced with such apparatus is dependent upon the stability of the apparatus and it is highly desirable to provide a positive interconnection between support unit 44 and the elongated members 32, 34. It will be understood that the connection between elongated member 34 and support unit 44 is identical to that shown for the connection between elongated member 32 and support unit 44. The ends of elongated members 32 and 34 which join support unit 44 is bifurcated such that upper and lower bifurcations 32*a* and 32*b* extend respectively above and below the surface of support unit 44. A pivot pin 40 extends through aligned apertures 46 and 50.

The tracing member 52 is disposed at the lower extremity as viewed on the support unit 44.

Figure 3:
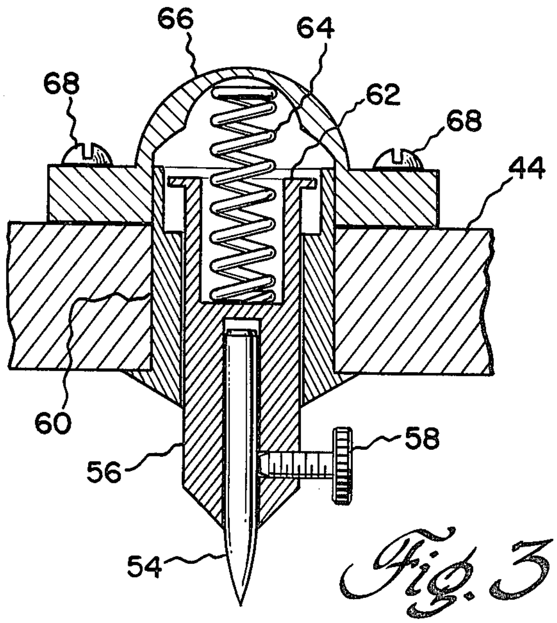
FIG. 3 is a partial elevational view which is partly schematic of one form of the apparatus shown in FIG. 1.

Referring to FIG. 3 there is shown a tracer point in accordance with one form of the invention. Point 54 is carried in a retainer 56 where it is secured by means of a lock screw 58. The retainer 56 is carried in a sleeve 60 which allows relative longitudinal movement therebetween. The sleeve 60 is fixed to support unit 44. A lip 62 limits the extent of longgitudinal movement of the retainer 56. A coil spring 64 provides a bias to urge the retainer 56 in a downward direction (as viewed). A cover 66 is fixed by means of screws 68, 68 to the support unit 44. An air pressure relief venting hole may be added at the top of Cap 66.

Figure 8:
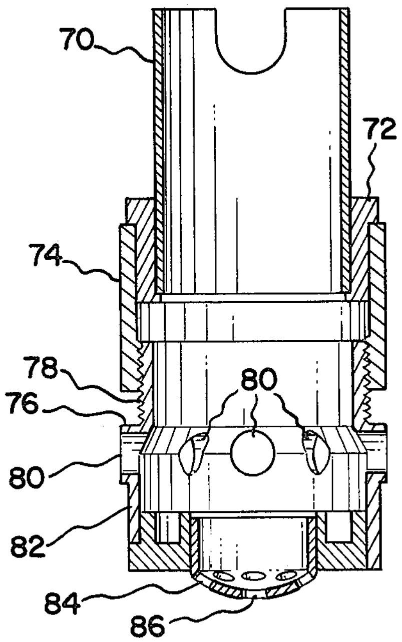
FIG. 8 is an elevational view in partial section of the structure for holding an engraving tool in accordance with one form of the invention.

Various other cutting or marking implements may be used. Referring to FIG. 8 there is shown a structure which is particularly suited for holding an engraving tool such as the "Dremel Model 381 Moto Tool". This apparatus is manufactured by the Dremel Manufacturing Division of Emerson Electric Company, 4915 21st Street, Racine, Wisc. 53406. The structure includes a tube 70 which cooperates with a tube adapter flange 72 which in turn cooperates with an internally threaded collar 74. The internally threaded collar 74 is intended to provide a means whereby the depth of cut may be varied. More particularly a base 76 is provided which has external threads 78 which cooperate with the internal threads of the collar 74 to vary the axial position of the Dremel engraving tool carried within this assembly. Ventilation holes 80 are provided. A flange 82 supports a depth-of-cut shield 82A, and is provided at the lower extremity of this assembly which is provided with vents 84 which allow any cuttings produced by the cutter to be discharged. Structure comprised of tube 70, flane 72, and collar 74, may be injection molded and/or machined as one integral piece. Aperture 86 in the shield 82A is provided for the cutter.

Figure 4:
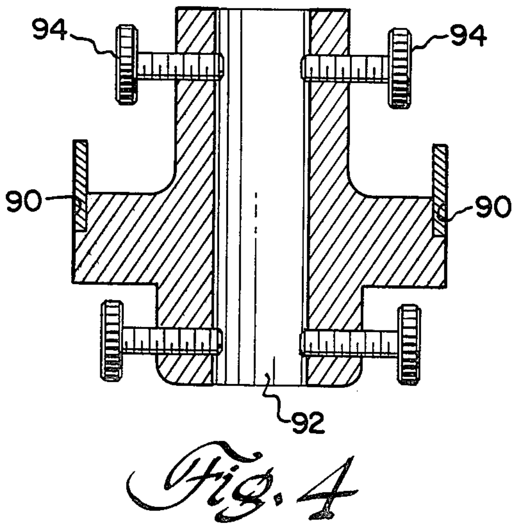
FIG. 4 is a partial elevational view of one form of the apparatus shown in FIG. 1.

Referring now to FIG. 4 there is shown a brush holder which is intended for cooperation with support unit 44. The surface 90 provides an interference fit in a manner comparable to the flange 82 shown in FIG. 8. A central bore 92 has radially extending lock screws 94 for locking a marking instrument such as a brush or a felt tip pen.

Figure 6:
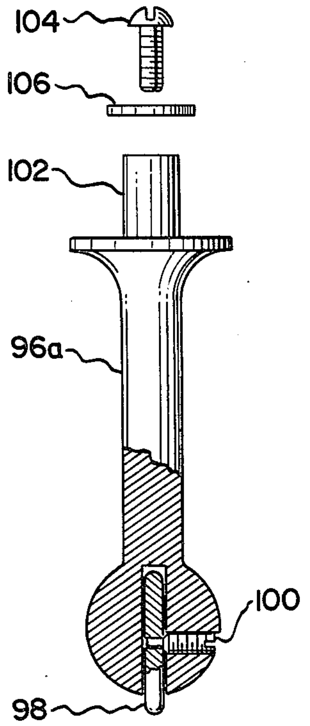
FIGS. 6 and 7 are partial elevational views of alternate support structures which may be used to support one portion of the pantograph linkage.
Figure 7:
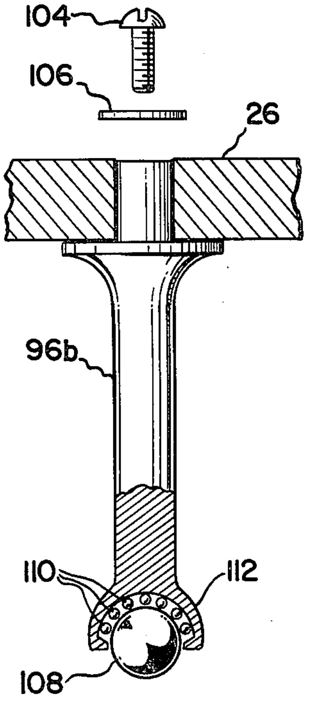

Referring now to FIGS. 6 and 7 there are shown alternate support structures for the disc 26 to insure that the pantograph mechanism will glide easily to a desired position. In the embodiment shown in FIG. 6 the support 96*a* is provided with a disc 98 which is carried by a set screw 100 which acts as an axle. The disc 98 may be manufactured of the material identified commercially by the trademark Teflon which is a fluorocarbon resin manufactured by E. I. Du Pont de Nemours and Company of Wilmington, Delaware. The upper extremity as illustrated is provided with a threaded surface 102 which has an internal bore (not shown) which cooperates with a machine screw 104 and washer 106 to secure the support to the disc 26. It will be understood that the disc 98 may be alternately designed to rotate or to be fixed in place.

In one embodiment shown in FIG. 7 an alternate embodiment includes a spherical member 108 which may be either a steel or other metallic ball or alternatively may be manufactured of Teflon. In one form the spherical member 108 is mounted for rotation with a plurality of balls 110 which allow for ease of rotational movement. The lower extremity 112 of the support 96*b* is swaged around the ball 108 to prevent escape thereof.

Figure 5:
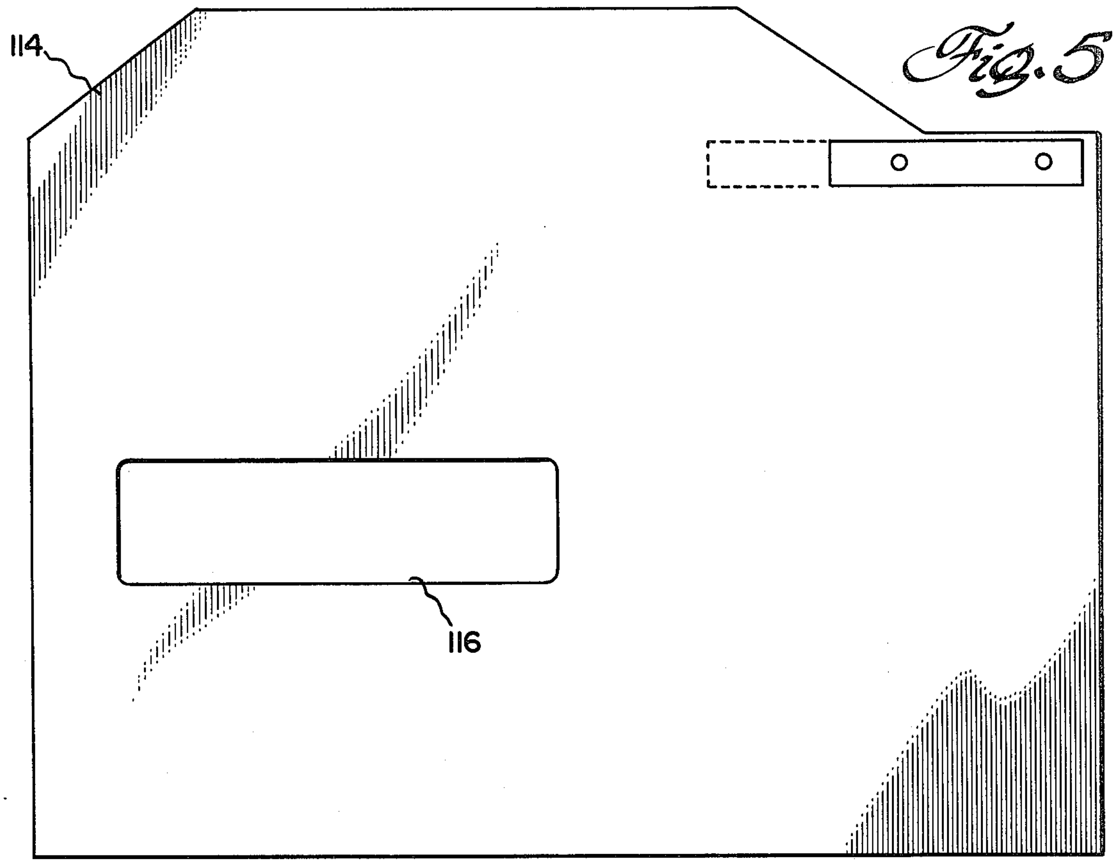
FIG. 5 is a plan view of an alternate form of the base or planar surface shown in FIG. 1 in accordance with another embodiment of the invention.

Referring to FIG. 5 there is shown an alternate form of the base 10 which is identified by the numeral 114. An opening 116 is provided for pens or brushes which may extend and which may be held underneath the base 114.

In operation the user will position an image which is to be followed on the base 10 together with a piece of metal or a piece of paper or other object on which an image is to be produced. By following the image to be copied with the follower 52 a clear image is produced. It will be understood that the apparatus in accordance with the invention will have application for reproducing artistic images as well as for making precision lettering. It will be further understood that the apparatus permits coverage of a much wider area than would be possible with conventional pantograph mechanisms which do not include a slide. In the embodiment shown in FIG. 5 it will be understood that the opening 116 permits the reproduction of an image on a very large piece of material such as a large poster board which ordinarily would be much too large for use with conventional pantograph mechanisms. The apparatus may be used with conventional diamond-drag engraving on materials such as glass or metal. The apparatus in accordance with the invention may, of course, also be used with wood, tile, plastic, and other engravable materials. The Dremel tool referred to above would ordinarily be provided with a chuck of about one eighth inch capacity and would ordinarily have a rotating speed of around 25,000 rpm. It will be seen that the central support may include ball bearing supported spherical members such as those shown in FIG. 7. The cutter is provided with the depth of cut shield which increases the safety and avoids accidental damage to the surface on which an image is being produced. The invention has particular application to translucent materials where it is desired to produce signs having back lighting as well as other dramatic effects. The plastic materials which may be used include lucite and acrylic materials. Although the apparatus has been described in terms of a pantograph mechanism which has a one to one ratio between the object which is being copied and the image which is being produced it will be understood that the invention also contemplates the use of a pantograph arm linkage which may vary the sizes of the two images.

Having thus described my invention I claim:

1. A mechanism for duplicating an image which comprises:

a first generally planar surface having a slot therein;

an elongated slide disposed in said slot which is dimensioned and configured to engage said slot to allow movement thereof;

first and second elongated members each having one end pivotally carried on said elongated slide at respectively first and second points spaced a first distance;

a connecting member which is pivotally connected to the other end of said first and second elongated members at third and fourth points thereof, said third and fourth points being spaced said first distance apart;

third and fourth elongated members each having one end pivotally carried on said connecting member at respectively fifth and sixth points which are spaced said first distance apart;

a support pivotally engaging the other end of said third and fourth elongated members at respectively seventh and eighth points which are spaced said first distance;

means for producing an image on an associated member carried on said support; and means for following an associated master image carried on said support, said means for following comprising an elongated pointed member which is axially spring biased toward the associated master and which is mounted to allow axial movement of said elongated pointed member toward and away from the associated master.

2. The apparatus as described in claim 1 wherein said means for producing an image comprises a sleeve and lock screws for holding an implement therein.

3. The apparatus as described in claim 1 further includes a spherical support member.

4. The apparatus as described in claim 3 wherein said spherical member is made of Teflon.

5. The apparatus as described in claim 4 wherein said spherical member is mounted for rotation.

6. The apparatus as described in claim 1 further includes a planar disc support disposed at the axial extremity of said means following with the plane thereof substantially coincident with a perpendicular to the plane of the associated master image.

7. The apparatus as described in claim 6 wherein said disc is manufactured of Teflon.

8. The apparatus as described in claim 1 wherein said means for producing an image comprises a laser cutting device.

9. The apparatus as described in claim 1 wherein said means for producing comprises an abrasive particle cutting device.

10. The apparatus as described in claim 1 wherein said means for producing includes a sonic generating device.

11. The apparatus as described in claim 1 wherein said means for producing includes means for producing heat.

* * * * *